United States Patent
Pang et al.

(10) Patent No.: US 12,189,909 B2
(45) Date of Patent: Jan. 7, 2025

(54) TOUCH SUBSTRATE, MANUFACTURING METHOD THEREOF AND TOUCH DEVICE

(71) Applicants: Hefei Xinsheng Optoelectronics Technology Co., Ltd., Anhui (CN); BOE TECHNOLOGY GROUP CO., LTD., Beijing (CN)

(72) Inventors: Bin Pang, Beijing (CN); Xiaodong Xie, Beijing (CN); Min He, Beijing (CN); Tengfei Zhong, Beijing (CN); Wenjie Xu, Beijing (CN); Xinxiu Zhang, Beijing (CN); Tianyu Zhang, Beijing (CN); Xue Zhao, Beijing (CN); Huayu Sang, Beijing (CN)

(73) Assignees: Hefei Xinsheng Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 201 days.

(21) Appl. No.: 17/635,738

(22) PCT Filed: Apr. 16, 2021

(86) PCT No.: PCT/CN2021/087678
§ 371 (c)(1),
(2) Date: Feb. 16, 2022

(87) PCT Pub. No.: WO2022/217569
PCT Pub. Date: Oct. 20, 2022

(65) Prior Publication Data
US 2023/0341984 A1    Oct. 26, 2023

(51) Int. Cl.
*G06F 3/044* (2006.01)

(52) U.S. Cl.
CPC .......... *G06F 3/0446* (2019.05); *G06F 3/0445* (2019.05); *G06F 2203/04103* (2013.01); *G06F 2203/04107* (2013.01)

(58) Field of Classification Search
CPC ................. G06F 3/0446; G06F 3/0445; G06F 2203/04103; G06F 2203/04107
See application file for complete search history.

(56) References Cited

U.S. PATENT DOCUMENTS

| | | | |
|---|---|---|---|
| 2015/0085201 | A1 | 3/2015 | Chen |
| 2017/0322652 | A1* | 11/2017 | Ikeda ................ G02F 1/136204 |
| 2019/0319051 | A1* | 10/2019 | Lin ..................... H01L 29/7869 |

FOREIGN PATENT DOCUMENTS

| | | |
|---|---|---|
| CN | 104615322 A | 5/2015 |
| CN | 104793817 A | 7/2015 |

(Continued)

*Primary Examiner* — Amare Mengistu
*Assistant Examiner* — Sarvesh J Nadkarni
(74) *Attorney, Agent, or Firm* — HOUTTEMAN LAW LLC

(57) ABSTRACT

The present disclosure provides a touch substrate having a touch electrode area and a peripheral area surrounding the touch electrode area. The touch substrate includes: a touch electrode layer in the touch electrode area and an electrostatic release structure in the peripheral area. The touch electrode layer includes touch electrodes and dummy electrodes alternately arranged along a first direction and separated from each other, the touch electrodes and the dummy electrodes extend along a second direction intersecting the first direction, the touch electrodes and the dummy electrodes both are conductive mesh structures, and the dummy electrode has a first end and a second end along the second direction and includes at least one conductive path that is continuous between the first end and the second end. The at least one conductive path is electrically connected to the electrostatic release structure.

18 Claims, 6 Drawing Sheets

(56) References Cited

FOREIGN PATENT DOCUMENTS

| | | | |
|---|---|---|---|
| CN | 106200068 | A | 12/2016 |
| CN | 106933398 | A | 7/2017 |
| CN | 107037926 | A | 8/2017 |
| CN | 206931072 | U | 1/2018 |
| CN | 108170327 | A | 6/2018 |
| CN | 108399858 | A | 8/2018 |
| CN | 208000557 | U | 10/2018 |
| CN | 110456943 | A | 11/2019 |

* cited by examiner

TOUCH SUBSTRATE, MANUFACTURING METHOD THEREOF AND TOUCH DEVICE

CROSS-REFERENCE TO RELATED APPLICATION

This is a National Phase Application filed under 35 U.S.C 371 as a national stage of PCT/CN2021/087678, filed on Apr. 16, 2021, the contents of which are incorporated herein in their entirety by reference.

BACKGROUND

In recent years, large-sized touch display panels have become popular. In a conventional touch display panel, indium tin oxide is generally used as a material of a touch electrode. However, some problems exist in using an indium tin oxide touch electrode for the large-sized touch display panel. Indium tin oxide has a relatively large resistance, and thus resistance-capacitance delay (RC delay) increases as a size of a touch substrate increases, resulting in an inaccurate touch result.

SUMMARY

In one aspect, the present disclosure provides a touch substrate having a touch electrode area and a peripheral area surrounding the touch electrode area. The touch substrate includes:
  a first touch electrode layer in the touch electrode area, the first touch electrode layer including first touch electrodes and first dummy electrodes alternately arranged along a first direction and separated from each other, wherein the first touch electrodes and the first dummy electrodes extend along a second direction intersecting the first direction, the first touch electrodes and the first dummy electrodes both are conductive mesh structures, and the first dummy electrode has a first end and a second end along the second direction and includes at least one conductive path that is continuous between the first end and the second end; and
  an electrostatic release structure in the peripheral area, the at least one conductive path being electrically connected to the electrostatic release structure.

In an embodiment of the present disclosure, the first dummy electrode includes a floating dummy electrode and a main dummy electrode, the floating dummy electrode includes a plurality of structures isolated from each other, the main dummy electrode includes the at least one conductive path that is continuous between the first end and the second end, and the floating dummy electrode is separated from the main dummy electrode by disconnection parts.

In an embodiment of the present disclosure, the main dummy electrode includes a plurality of dummy sub-electrodes, the floating dummy electrode includes a first floating dummy electrode between adjacent dummy sub-electrodes, the first floating dummy electrode is separated from the dummy sub-electrodes on two sides thereof by the disconnection part, and each dummy sub-electrode includes at least one conductive path that is continuous between the first end and the second end.

In an embodiment of the present disclosure, the first floating dummy electrode includes a plurality of first structures isolated from each other, and the first structures include at least one of linear structures and X-shaped structures.

In an embodiment of the present disclosure, the first structures are X-shaped structures.

In an embodiment of the present disclosure, the floating dummy electrode includes a second floating dummy electrode between the main dummy electrode and a first touch electrode adjacent to the first dummy electrode, and the second floating dummy electrode is separated from the main dummy electrode by first disconnection parts and is separated from the first touch electrode adjacent to the first dummy electrode by second disconnection parts.

In an embodiment of the present disclosure, the second floating dummy electrode includes a plurality of second structures isolated from each other, and the second structures include at least one of linear structures and X-shaped structures.

In an embodiment of the present disclosure, the second structures are linear structures.

In an embodiment of the present disclosure, the touch substrate further includes a second touch electrode layer insulated from and stacked with the first touch electrode layer in the touch electrode area, and a second connection part in the peripheral area; and
  the second touch electrode layer includes second touch electrodes and second dummy electrodes alternately arranged along the second direction and separated from each other, the second touch electrodes and the second dummy electrodes extend along the first direction, the second touch electrodes and the second dummy electrodes both are conductive mesh structures, and the second dummy electrode has a third end and a fourth end along the first direction and includes at least one conductive path that is continuous between the third end and the fourth end, and the at least one conductive path is electrically connected to the electrostatic release structure.

In an embodiment of the present disclosure, the first touch electrodes and the first dummy electrodes are made of a same material and have a same mesh pattern.

In an embodiment of the present disclosure, the touch substrate further includes a first connection part in the peripheral area, the first connection part is connected to at least one of the first end and the second end and is electrically connected to the electrostatic release structure.

In an embodiment of the present disclosure, the first connection part and the first dummy electrode are made of a same material.

In an embodiment of the present disclosure, a touch signal line is between the first connection part and the electrostatic release structure and in a same layer as the first dummy electrode; and the first connection part includes a first conductive layer and a second conductive layer which are stacked, the first conductive layer is electrically connected to one of the first end and the second end, the second conductive layer is connected to the electrostatic release structure, and the first conductive layer is electrically connected to the second conductive layer through a conductive via.

In an embodiment of the present disclosure, the first dummy electrode, the first connection part and the electrostatic release structure are in a same layer.

In an embodiment of the present disclosure, the electrostatic release structure is a ground line.

In another aspect, the present disclosure further provides a touch device, including the above touch substrate.

In still another aspect, the present disclosure further provides a method for manufacturing a touch substrate, including:
  forming a first touch electrode layer in a touch electrode area of the touch substrate, where the first touch electrode layer includes first touch electrodes and first dummy electrodes alternately arranged along a first direction and separated from each other, the first touch electrodes and the first dummy electrodes extend along a second direction intersecting the first direction, the first touch electrodes and the first dummy electrodes both are conductive mesh structures, and the first dummy electrode has a first end and a second end along the second direction and includes at least one conductive path that is continuous between the first end and the second end;

forming a first connection part in a peripheral area surrounding the touch electrode area of the touch substrate, the first connection part being connected to at least one of the first end and the second end; and forming an electrostatic release structure in a peripheral area, the at least one conductive path being electrically connected to the electrostatic release structure.

In an embodiment of the present disclosure, the method further includes:

forming an insulating layer on the first touch electrode layer; and forming, on a side of the insulating layer away from the first touch electrode layer, a second touch electrode layer in the touch electrode area and a second connection part in the peripheral area, wherein the second touch electrode layer includes second touch electrodes and second dummy electrodes alternately arranged along the second direction and separated from each other, the second touch electrodes and the second dummy electrodes extend along the first direction, the second touch electrodes and the second dummy electrodes both are conductive mesh structures, and the second dummy electrode has a third end and a fourth end along the first direction and includes at least one conductive path that is continuous between the third end and the fourth end, and the at least one conductive path is electrically connected to the electrostatic release structure.

In an embodiment of the present disclosure, the first touch electrode layer and the first connection part are simultaneously formed in a same patterning process.

In an embodiment of the present disclosure, the method further includes: forming a first connection part in the peripheral area, wherein the first connection part is connected to at least one of the first end and the second end and is electrically connected to the electrostatic release structure.

BRIEF DESCRIPTION OF DRAWINGS

The drawings are used to provide a further understanding of the present disclosure, constitute a part of specification, and explain the technical solutions of the present disclosure together with the embodiments of the present disclosure, but is not intended to limit the present disclosure. The shapes and sizes of various elements in the drawings do not reflect the true scale and are merely illustrative of the present disclosure.

FIG. 7b is a cross-sectional view taken along a line A-A'-A" of the structure shown in FIG. 7a.

DETAIL DESCRIPTION OF EMBODIMENTS

Figure 1:
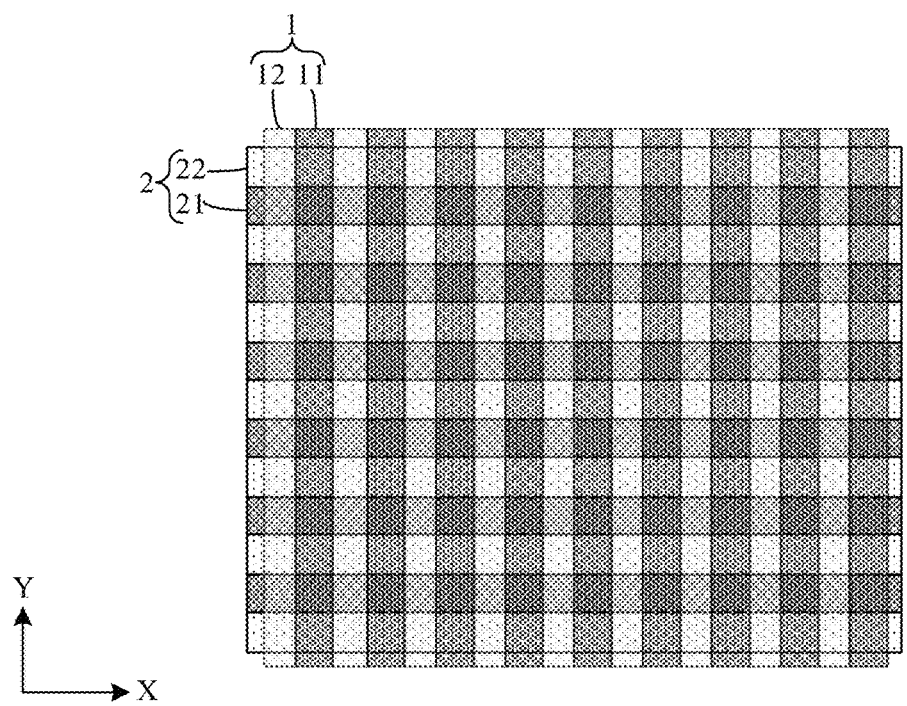
FIG. 1 is a schematic diagram of a touch substrate according to an embodiment of the present disclosure.

The technical solutions in the embodiments of the present disclosure will be clearly and completely described below with reference to the drawings. The exemplary embodiments of the present disclosure and various features and advantageous details thereof are illustrated more fully with reference to the non-restrictive exemplary embodiments that are shown in the drawings and are described in detail in the following description. It should be noted that the features shown in the drawings are not necessarily drawn to scale. Descriptions of known materials, components, and process techniques are omitted in the present disclosure so as to avoid obscuring the exemplary embodiments of the present disclosure. The given examples are merely intended to facilitate understanding of implementations of the exemplary embodiments of the present disclosure and to further enable those skilled in the art to implement the exemplary embodiments. Accordingly, these examples should not be construed as limiting the scope of the embodiments of the present disclosure.

Unless otherwise defined, the technical terms or scientific terms used in the present disclosure should have general meanings that can be understood by those skilled in the art. The words "first", "second" and the like used in the present disclosure do not denote any order, quantity, or importance, and are merely used to distinguish between different elements. The word "include", "comprise" or the like indicates that an element or object before the word covers elements, objects or the equivalents thereof listed after the word, but does not exclude other elements or objects. The words "above", "under", "left", "right" and the like are merely used to indicate relative positional relationships, and when an absolute position of a described object is changed, the relative positional relationships may be changed accordingly.

The implementation for integrating a touch function in a display panel includes forming an on-cell touch structure in the display panel by forming a touch structure between a color filter substrate and a polarizer of the display panel. The touch structure generally includes a mutual capacitive touch structure and a self-capacitive touch structure.

The mutual capacitive touch structure includes touch driving electrodes and touch receiving electrodes extending along different directions, and a mutual capacitance for touch sensing is formed where touch driving electrodes Tx and touch receiving electrodes Rx intersect each other. The touch driving electrode Tx is configured to input an excitation signal (a touch driving signal), and the touch receiving electrode Rx is configured to output a touch sensing signal. By inputting the excitation signal to the touch driving electrode which, for example, extends along a vertical direction, and receiving the touch sensing signal from the touch receiving electrode which, for example, extends along a horizontal direction, a detection signal reflecting a capacitance value at a coupling point (e.g., an intersection point) of the horizontal electrode and the vertical electrode can be obtained. When a touch screen is touched by a finger, the coupling between the touch driving electrode and the touch receiving electrode near a touch point is affected, so that the capacitance value of mutual capacitance between the two electrodes at the intersection point is changed, resulting in a change in the touch sensing signal. According to data of two-dimensional capacitance variation of the touch screen based on the touch sensing signal, coordinates of the touch point may be calculated.

A process of tearing off a protective film is involved in a manufacturing process of touch control products, and a large amount of static electricity is easily generated in the process of tearing off the protective film. In addition, in a process that a user operates a touch control product without a cover plate, when a surface of the product is contacted by a finger or a glove, electrostatic charges carried by the finger or the glove may be transferred to the product, or electrostatic charges may be generated due to friction between the finger or the glove and a polarizer, resulting in abnormal display of a liquid crystal display panel under the effect of an external electric field.

The present disclosure provides a touch substrate which includes a touch electrode layer and has a touch electrode area and a peripheral area surrounding the touch electrode area. The touch substrate includes: the touch electrode layer located in the touch electrode area and an electrostatic release structure located in the peripheral area. The touch electrode layer includes touch electrodes and dummy electrodes which are alternately arranged along a first direction and are separated from each other, the touch electrodes and the dummy electrodes extend along a second direction intersecting the first direction, and the touch electrodes and the dummy electrodes both are conductive mesh structures; and the dummy electrode has a first end and a second end along the second direction and includes at least one conductive path that is continuous between the first end and the second end. The at least one conductive path is electrically connected to the electrostatic release structure, and the electrostatic release structure is configured to release static electricity.

In the present disclosure, the dummy electrode includes at least one conductive path that is continuous between two ends thereof, and the at least one conductive path is connected to a connection part, which is located in the peripheral area of the touch substrate and is connected to a ground line, through at least one end of the dummy electrode, so that electrostatic charges accumulated in the dummy electrode can be released, thereby effectively reducing the electrostatic charges accumulative in the dummy electrode. In the present disclosure, the electrostatic release structure may include a low voltage signal line, such as a ground line. The electrostatic release structure is described as a ground line as an example in the following.

FIG. 1 is a schematic diagram illustrating a touch substrate according to an embodiment of the present disclosure.

As shown in FIG. 1, the touch substrate includes a first touch electrode layer 1 and a second touch electrode layer 2 which are stacked.

The first touch electrode layer 1 includes first touch electrodes 11 and first dummy electrodes 12 which are alternately arranged along a first direction. The first touch electrodes 11 and the first dummy electrodes 12 are separated from each other so as to be electrically insulated from each other. The first touch electrodes 11 and the first dummy electrodes 12 both extend along a second direction, and the second direction intersects the first direction.

The second touch electrode layer 2 includes second touch electrodes 21 and second dummy electrodes 22 which are alternately arranged along the second direction. The second touch electrodes 21 and the second dummy electrodes 22 are separated from each other so as to be electrically insulated from each other. The second touch electrodes 21 and the second dummy electrodes 22 both extend along the first direction.

In the embodiment of the present disclosure, the first direction is perpendicular to the second direction. For example, the first direction is a horizontal direction X, and the second direction is a vertical direction Y. In the embodiment of the present disclosure, one of the first touch electrode 11 and the second touch electrode 21 is a touch driving electrode, and the other of the first touch electrode 11 and the second touch electrode 21 is a touch receiving electrode. In the embodiment of the present disclosure, the touch substrate is a mutual capacitive touch substrate.

In the present disclosure, the term "touch electrode area" refers to an area, including the touch electrode layer, of the touch substrate, for example, the touch electrode area is defined by the touch electrode layer; the term "peripheral area" refers to an area provided with various circuits and wires for transmitting signals to the touch substrate; and the term "in a same layer" means that various structures are simultaneously formed in a same patterning process.

Figure 2:
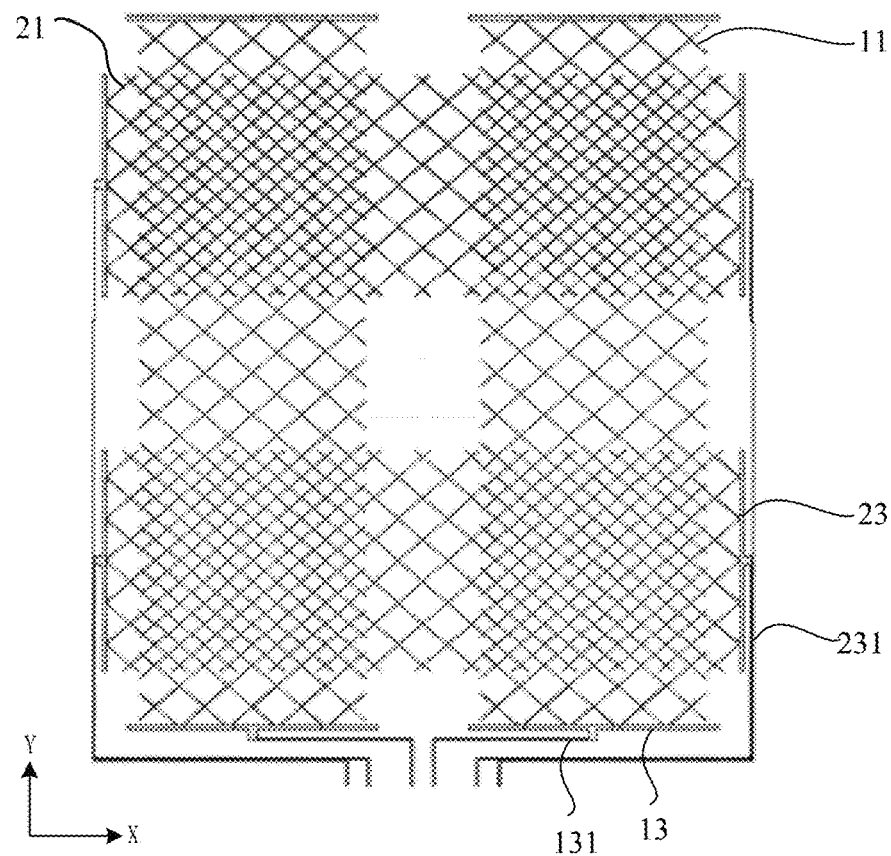
FIG. 2 is a schematic diagram illustrating first touch electrodes and second touch electrodes of the touch substrate shown in FIG. 1.

FIG. 2 is a schematic diagram illustrating the first touch electrodes and the second touch electrodes of the touch substrate shown in FIG. 1. For convenience of description, only two of the first touch electrodes 11 extending along the second direction and two of the second touch electrodes 21 extending along the first direction are shown in FIG. 2. As shown in FIG. 2, the first touch electrode 11 is a complete conductive mesh structure, and the conductive mesh structure is in a strip shape as a whole. The first touch electrode 11 is connected to a corresponding signal line 131 at one end (e.g., a lower end shown in FIG. 2) of the first touch electrode 11 through a first touch connection part 13, and the signal line 131 is further connected to a touch IC. As shown in FIG. 2, the second touch electrode 21 is a complete conductive mesh structure, and the conductive mesh structure is in a strip shape as a whole. The second touch electrode 21 is connected to corresponding signal lines 231 at two ends of the second touch electrode 21 through second touch connection parts 23, and the signal lines 231 are further connected to the touch IC.

In the embodiment of the present disclosure, since the first touch electrode 11 and the second touch electrode 21 both are complete conductive mesh structures (there is no disconnection in the conductive mesh structure along a direction in which the strip shape extends), electrostatic charges accumulated in the first touch electrode 11 and the second touch electrode 21 are easily released.

Figure 3:
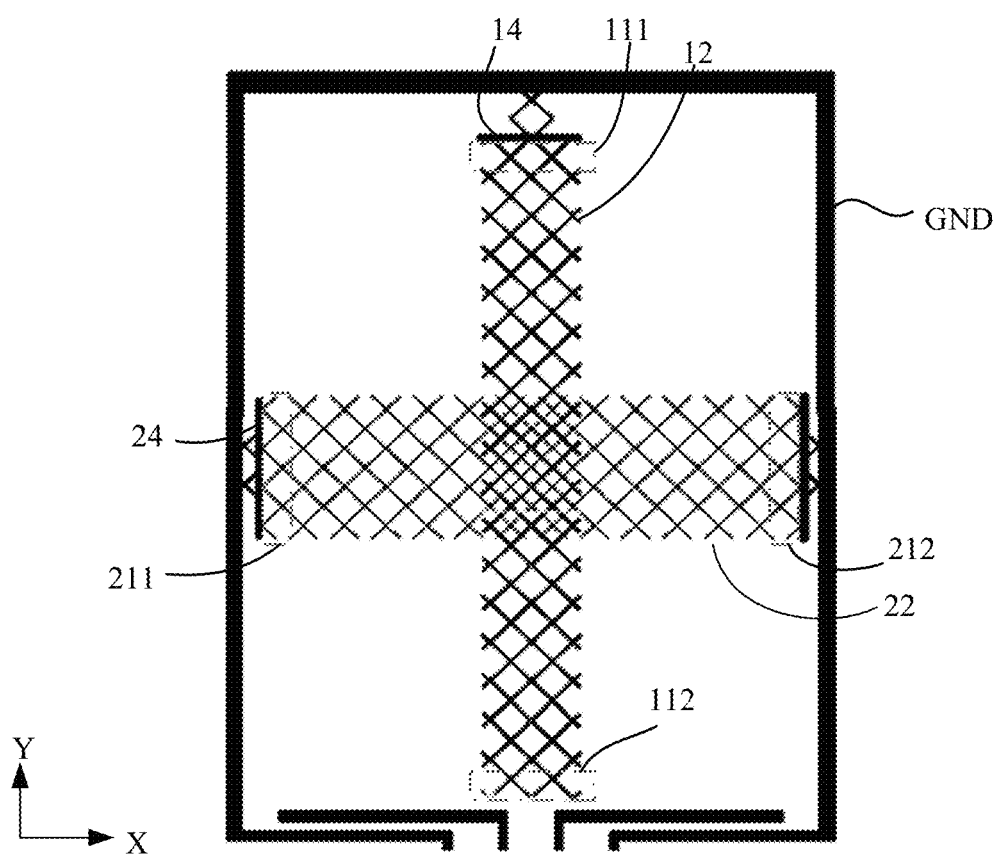
FIG. 3 is a schematic diagram illustrating a first dummy electrode and a second dummy electrode of the touch substrate shown in FIG. 1.

FIG. 3 is a schematic diagram of the first dummy electrode and the second dummy electrode of the touch substrate shown in FIG. 1. For convenience of description, only one first dummy electrode and one second dummy electrode are shown in FIG. 3. As shown in FIG. 3, the first dummy electrode 12 has a conductive mesh structure, and the conductive mesh structure is in a strip shape as a whole. The first dummy electrode 12 has a first end 111 and a second end 112 along the second direction Y and includes at least one conductive path that is continuous between the first end 111 and the second end 112. At least one of the first end 11 and the second end 112 of the first dummy electrode 11 is connected to a ground line GND through a first connection part 14 located in the peripheral area of the touch substrate such that the at least one conductive path that is continuous between the first end 111 and the second end 112 is grounded through the first connection part 14. As shown in FIG. 3, the second dummy electrode 22 has a conductive mesh structure, and the conductive mesh structure is in a strip shape as a whole. The second dummy electrode 22 has a third end 211 and a fourth end 212 along the first direction X and includes at least one conductive path that is continuous between the third end 211 and the fourth end 212. At least one of the third end 211 and the fourth end 212 of the second dummy electrode 21 is connected to the ground line GND through a second connection part 24 located in the peripheral area of the touch substrate such that the at least one conductive path that is continuous between the third end 211 and the fourth end 212 is grounded through the second connection part 24.

In the embodiment of the present disclosure, the ground line GND is disposed on each side of the peripheral area of the touch substrate.

Figure 4:
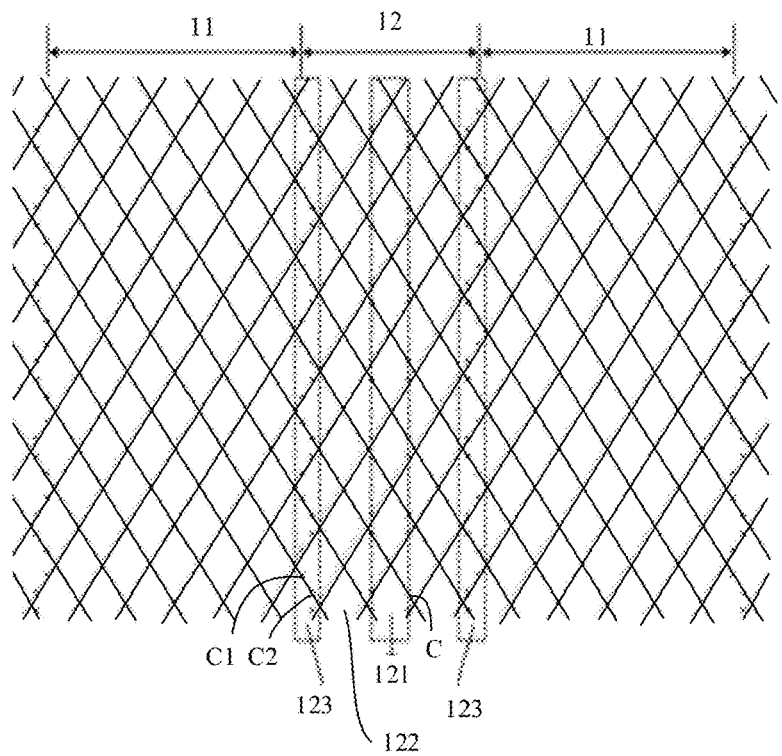
FIG. 4 is a schematic diagram illustrating two first touch electrodes and a first dummy electrode located between the two touch electrodes in a first touch electrode layer shown in FIG. 1.

FIG. 4 is a schematic diagram illustrating two first touch electrodes and the first dummy electrode located between the two touch electrodes in the first touch electrode layer shown in FIG. 1.

As shown in FIG. 4, the first dummy electrode 12 includes a first floating dummy electrode 121, a main dummy electrode 122, and a second floating dummy electrode 123. The main dummy electrode 122 includes the at least one conductive path that is continuous between the first end 111 and the second end 112 and is configured to release electrostatic charges accumulated in the first dummy electrode 12.

Figure 5:
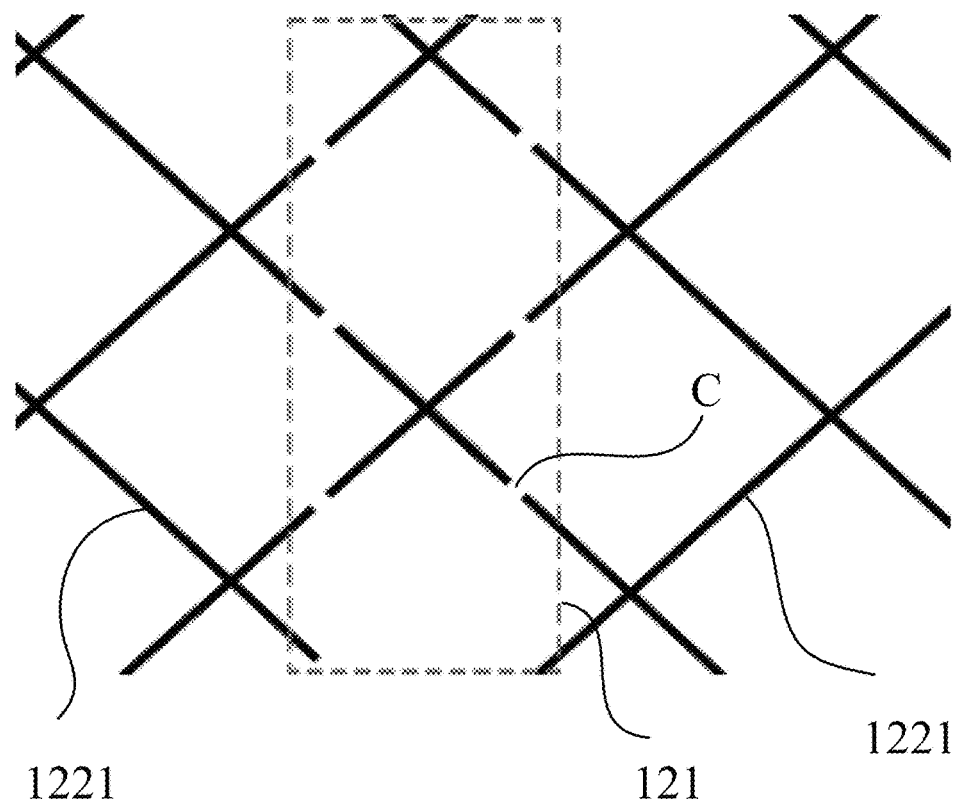
FIG. 5 is a schematic diagram illustrating a first floating dummy electrode in a first dummy electrode according to an embodiment of the present disclosure.

The first floating dummy electrode 121 divides the main dummy electrode 122 into two dummy sub-electrodes 1221 (see FIG. 5), and is located between the two dummy sub-electrodes 1221. The first floating dummy electrode 121 is separated from and thus electrically insulated from the dummy sub-electrodes 1221 located at two sides of the first floating dummy electrode 121 by disconnection parts C. In the embodiment of the present disclosure, as shown in FIG. 5, the first floating dummy electrode 121 are formed as a plurality of cross-shaped structures isolated from each other.

Figure 6:
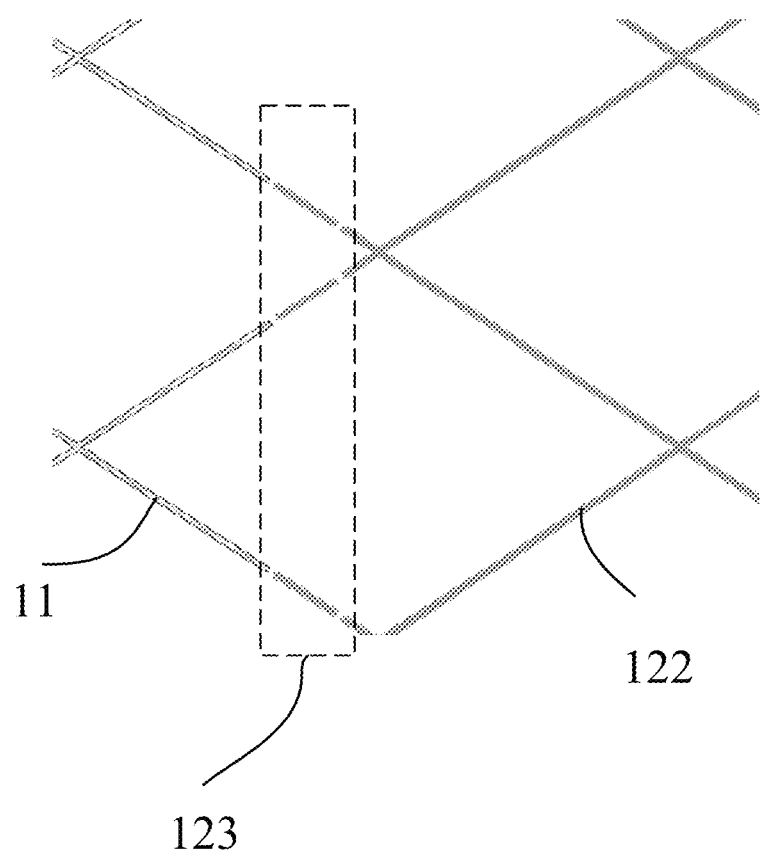
FIG. 6 is a schematic diagram illustrating a second floating dummy electrode in a first dummy electrode according to an embodiment of the present disclosure.

The second floating dummy electrode 123 is located between the main dummy electrode 122 and a first touch electrode 11 on one side of the first dummy electrode 12. The second floating dummy electrode 123 is separated from and thus electrically insulated from the main dummy electrode 122 by first disconnection parts C1. The second floating dummy electrode 123 is separated from and thus electrically insulated from the first touch electrode 11 by second disconnection parts C2. In the embodiment of the present disclosure, as shown in FIG. 6, the second floating dummy electrode 123 is formed as a plurality of linear structures isolated from each other. In the present disclosure, the disconnection part refers to a position where a conductive line constituting the conductive mesh structure is disconnected. In some embodiments, a length of the disconnected part along a direction in which the conductive line extends is greater than or equal to 10 μm and is less than or equal to 30 μm.

In order to reduce RC delay and improve touch sensitivity, a width of the touch electrode may be reduced. In this case, a relatively wide dummy electrode area exists between adjacent touch electrodes. If the dummy electrode area is directly provided only with dummy electrodes having complete mesh structures, signals in the touch electrodes may be interfered, affecting touch performance.

In the embodiment of the present disclosure, the dummy electrode is divided into three parts: the first floating dummy electrode, the main dummy electrode and the second floating dummy electrode; the first floating dummy electrode divides the main dummy electrode into the dummy sub-electrodes with a smaller width, so that the interference of the main dummy electrode to signals on the touch electrode is further reduced; in addition, the first floating dummy electrode is designed as X-shaped structures isolated from each other, on which it is unlikely to accumulate electrostatic charges; and the presence of the second floating dummy electrode can increase a distance between the touch electrode (e.g., the first touch electrode) and the main dummy electrode without affecting an optical effect of the touch substrate, so that the interference of the main dummy electrode to the signals on the touch electrode is reduced.

In the embodiment of the present disclosure, the second dummy electrode may have a structure similar to that of the first dummy electrode, which is not described in detail herein.

Although a case where the dummy electrode includes one first floating dummy electrode and the main dummy electrode includes two dummy sub-electrodes separated by the one first floating dummy electrode is shown in FIG. 4, the present disclosure is not limited thereto. It can be understood that the dummy electrode may include two or more first floating dummy electrodes, and accordingly, the main dummy electrode may include three or more dummy sub-electrodes separated by two or more first floating dummy electrodes. In addition, the dummy electrode may not include the first floating dummy electrode but only include the second floating dummy electrode, and in this case, the main dummy electrode includes only one dummy sub-electrode; alternatively, the dummy electrode may not include the second floating dummy electrode but only include the first floating dummy electrode, and in this case, the main dummy electrode includes two or more dummy sub-electrodes.

Although a case where the second floating dummy electrode includes a plurality of linear structures isolated from each other and the first floating dummy electrode includes a plurality of X-shaped structures isolated from each other is shown in FIG. 4, the present disclosure is not limited thereto. It can be understood that, according to practical applications, the second floating dummy electrode may be designed as a plurality of X-shaped structures isolated from each other, and/or the first floating dummy electrode may be designed as a plurality of linear structures isolated from each other. For example, in a case where a distance between the touch electrodes is relatively large, the second floating dummy electrode may be designed as a plurality of X-shaped structures isolated from each other.

In an embodiment of the present disclosure, a width of the linear structure in the first direction is greater than or equal to 10 μm and is less than or equal to 100 μm.

In an embodiment of the present disclosure, the first connection part and the first dummy electrode are made of a same material, and the second connection part and the second dummy electrode are made of a same material.

In an embodiment of the present disclosure, the first touch electrode and the first dummy electrode are made of a same material and have a same mesh pattern; and the second touch electrode and the second dummy electrode are made of a same material and have a same mesh pattern. In an embodiment of the present disclosure, the first touch electrode and the first dummy electrode are formed by a same patterning process, and the second touch electrode and the second dummy electrode are formed by a same patterning process.

In the present disclosure, "the same mesh pattern" means that the conductive lines constituting the mesh form a same pattern and have a same width.

In an embodiment of the present disclosure, the first touch electrode layer and the second touch electrode layer both are distributed on an entire touch area of the touch substrate. In this case, when the touch substrate is applied to a display device, it is beneficial to uniformity of light transmission of the display device. In addition, a part, which is not provided with touch electrodes, of the touch area of the touch substrate is provided with dummy electrodes having the same pattern as the touch electrodes, which is beneficial to uniformity in capacitance value.

In an embodiment of the present disclosure, on one side provided with both the first connection parts and the first touch connection parts, the first connection parts and the first touch connection parts are alternately arranged along the first direction; and on one side provided with both the second connection parts and the second touch connection parts, the second connection parts and the second touch connection parts are alternately arranged along the second direction. On one side provided with only the first touch connection parts, a sum of lengths of the first touch connection parts is d1; on one side provided with both the first connection parts and the first touch connection parts, a sum of lengths of the first connection parts and the first touch connection parts is d2; and d1 is substantially the same as d2.

In an embodiment of the present disclosure, the first connection part is disposed on one side (e.g., an upper side in FIG. 2), which is not provided with the touch signal line, of the peripheral area, the first connection part may be a single layer of metal, and the first touch electrode, the first connection part, and the ground line GND are located in a same layer, that is, the first touch electrode, the first connection part, and the ground line are electrically connected in sequence in the same layer. In this case, the electrostatic charges are released along the following path: the main dummy electrode→the single layer of metal of the first connection part→the ground line.

Figure 7A:
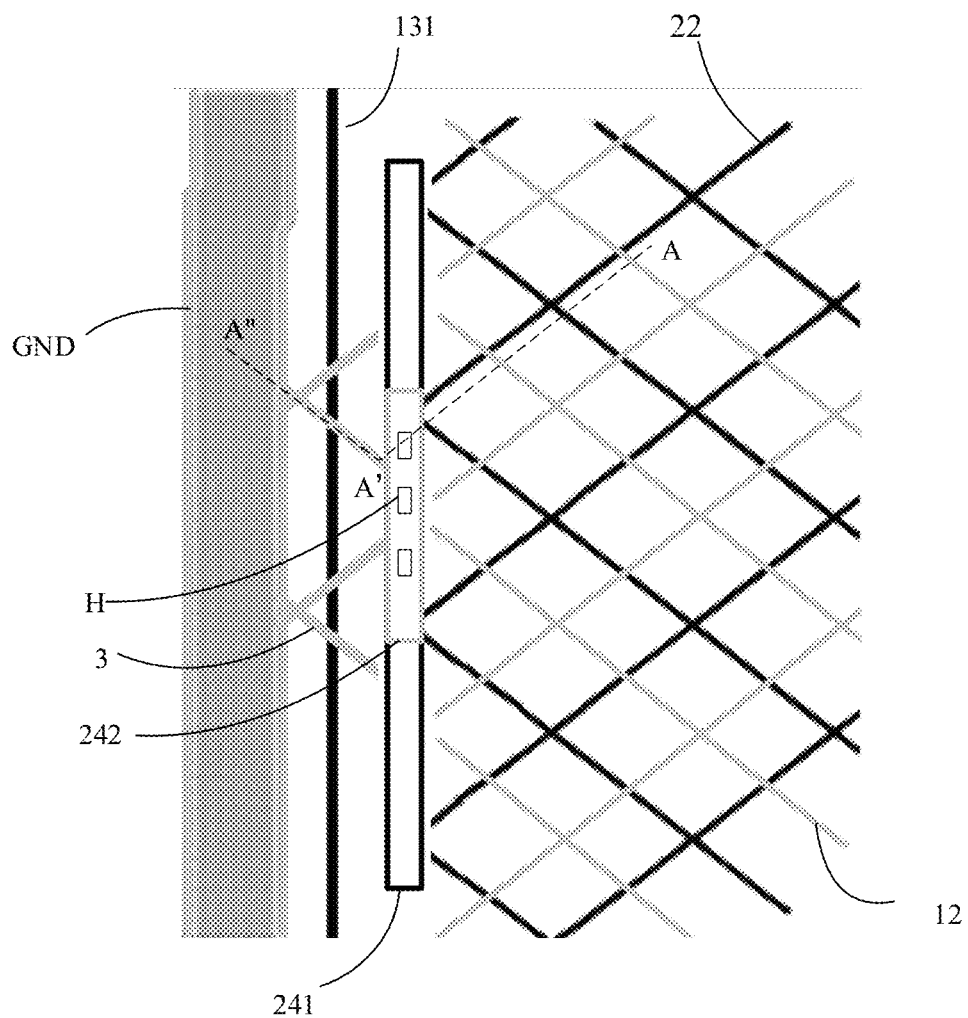
FIG. 7a is a schematic diagram illustrating connection between a second dummy electrode and a ground line through a second connection part according to an embodiment of the present disclosure.
Figure 7B:
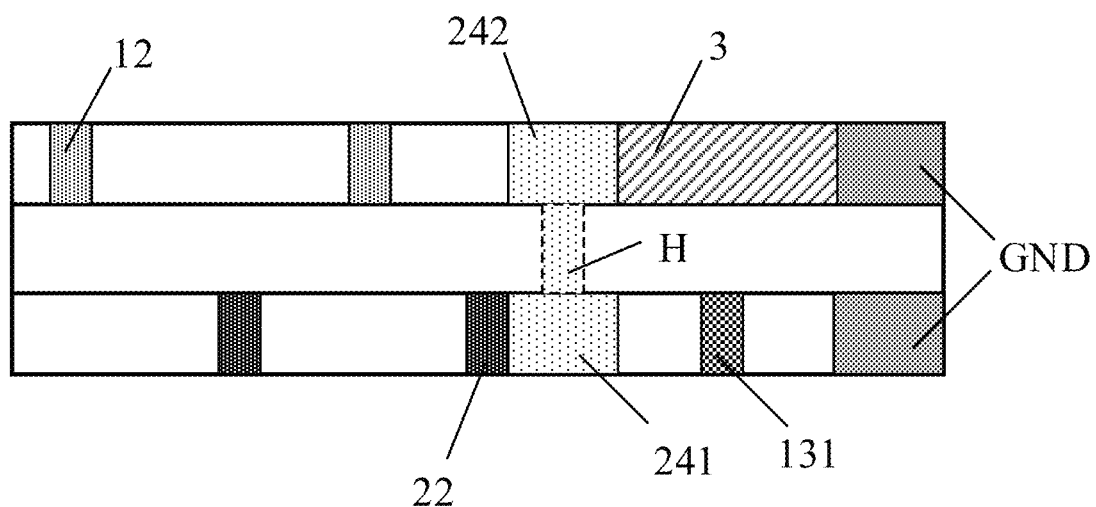

FIG. 7a is a schematic diagram illustrating connection between the second dummy electrode and the ground line through the second connection part according to an embodiment of the present disclosure. FIG. 7b is a cross-sectional view taken along a line A-A'-A" of the structure shown in FIG. 7a. In an embodiment of the present disclosure, as shown in FIG. 7a and FIG. 7b, the second connection part 24 is disposed on one side (e.g., a left side in FIG. 2), which is provided with the signal line 131, of the peripheral area, the second connection part 24 includes a first conductive layer 241 and a second conductive layer 242 which are stacked, the first conductive layer 241 is electrically connected to one end (e.g., left end) of the second dummy electrode 22, the second conductive layer 242 is connected to the ground line GND through the connection line 3, and the first conductive layer 241 is electrically connected to the second conductive layer 242 through a conductive via H.

The second dummy electrode 22, the second conductive layer 241, and the signal line 131 are located in a same layer (a first layer), and the second conductive layer 242 and the connection line 3 are located in a same layer (a second layer). Each of the first layer and the second layer is provided with the ground line GND. In this case, the electrostatic charges are released along the following path: the main dummy electrode (the second dummy electrode) →the first conductive layer of the second connection part→the conductive via→the second conductive layer of the second connection part→the connection line→the ground line. In some embodiments, the second conductive layer 242 and the connection line 3 may be part of a shielding mesh of the touch electrode in the peripheral area, and the shielding mesh is electrically insulated from the touch electrode. In some embodiments, the shielding mesh and the second dummy electrode have a same mesh pattern and are made of a same material. In some embodiments, the ground line GND is only provided on the layer where the second dummy electrode 22 is located (the first layer). In this case, the connection line 3 is further connected to the ground line GND located in the first layer through the conductive via. In some embodiments, a size of the second conductive layer 242 is smaller than that of the first conductive layer 241, and the reason is that the second conductive layer 242 is generally located on an outer side of the touch substrate, and in order to alleviate corrosion of the second conductive layer 242 when contacting with air, the size of the second conductive layer 242 is generally designed to be smaller.

In another aspect, the present disclosure further provides a touch device, including the above touch substrate.

It should be noted that the type of the touch device is not limited in the embodiments of the present disclosure. The touch device may be a liquid crystal display device or an organic light emitting diode (OLED) display device, may be a display device of other types, or may be a simple touch device.

Figure 8:
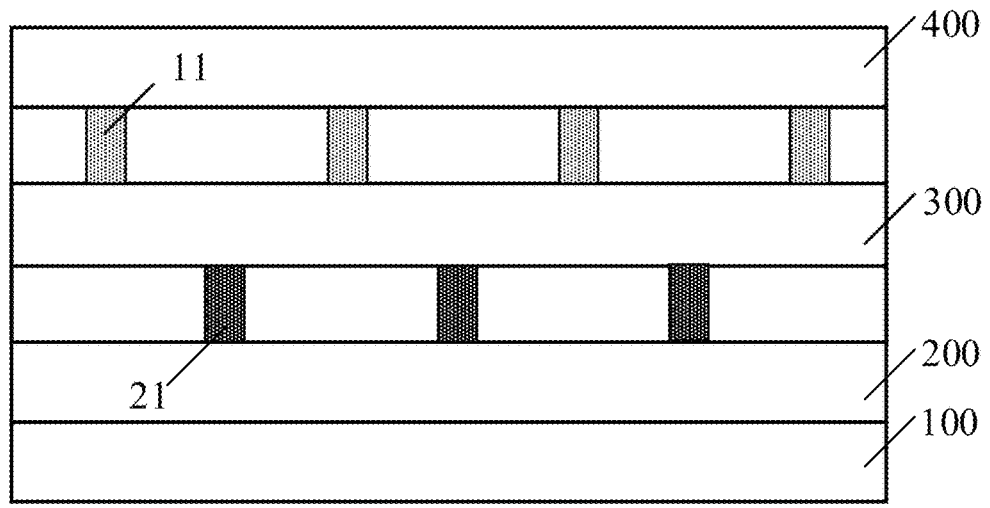
FIG. 8 is a cross-sectional view of a touch device according to an embodiment of the present disclosure.

FIG. 8 shows a cross-sectional view between two adjacent parallel conductive lines, along a direction parallel to a direction in which the conductive lines extend, of the conductive lines constituting the mesh structure of the first touch electrode in the case that the touch device is a liquid crystal display device. As shown in FIG. 8, the touch device includes: an array substrate 100 and a color filter substrate 200 which are opposite to each other; a second touch electrode layer 21 located on one side of the color filter substrate 200 away from the array substrate 100; an insulating layer 300 located on one side of the second touch electrode layer 21 away from the color filter substrate 200; a first touch electrode layer 11 located on one side of the insulating layer 300 away from the second touch electrode layer 21; and a polarizer 400 located on one side of the first touch electrode layer 11 away from the insulating layer 300. The first touch electrode layer 11 and the second touch electrode layer 21 may have the structures of the first touch electrode layer and the second touch electrode layer which are described above.

In the touch device according to the present disclosure, the dummy electrode includes at least one conductive path that is continuous between two ends thereof, and the at least one conductive path is connected to a connection part, which is located in the peripheral area of the touch substrate and is connected to a ground line, through at least one end of the dummy electrode, so that electrostatic charges accumulated in the dummy electrode can be released, thereby effectively reducing the accumulation of the electrostatic charges in the dummy electrode.

Figure 9:
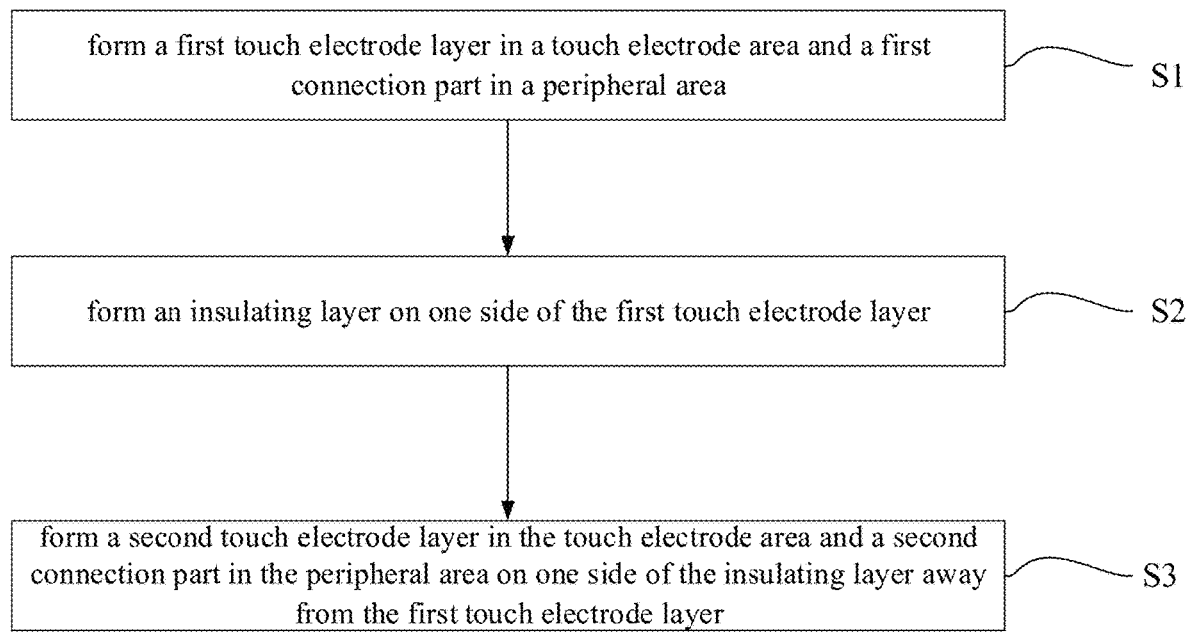
FIG. 9 is a schematic diagram of a method for manufacturing a touch substrate according to an exemplary embodiment of the present disclosure.

In still another aspect, the present disclosure further provides a method for manufacturing a touch electrode. As shown in FIG. 9, the method for manufacturing the touch substrate according to the present disclosure includes steps S1 to S3.

It should be noted that "patterning process" described in the present disclosure includes processing of depositing a film layer, coating a photoresist, mask exposure, developing, etching, stripping a photoresist, and the like, and "photolithography process" described in the present disclosure includes processing of coating a film layer, mask exposure, developing, and the like, which belong to mature manufacturing processes in the related art. The depositing may be performed by a known process such as sputtering, chemical vapor deposition, and the like, the coating may be performed by a known coating process, and the etching may be performed by a known method, which are not particularly limited herein.

In step S1, a first touch electrode layer located in a touch electrode area and a first connection part located in a peripheral area are formed. The first touch electrode layer includes first touch electrodes and first dummy electrodes which are alternately arranged along a first direction and are separated from each other, the first touch electrodes and the first dummy electrodes extend along a second direction intersecting the first direction, the first touch electrodes and the first dummy electrodes both are conductive mesh structures, the first dummy electrode has a first end and a second end along the second direction and includes at least one conductive path that is continuous between the first end and the second end, and the first connection part is connected to at least one of the first end and the second end such that the at least one conductive path that is continuous between the first end and the second end is connected to a ground line in the peripheral area through the first connection part.

In an embodiment of the present disclosure, forming the first touch electrode layer may include: forming a conductive material layer; and performing a patterning process on the conductive material layer to form the first touch electrodes and the first dummy electrodes which are alternately arranged along the first direction and are separated from each other.

The touch electrode layer may be manufactured by using various suitable conductive electrode materials and various suitable manufacturing methods. For example, the conductive electrode material may be deposited on a base substrate by sputtering or vapor deposition or solution coating, and then is patterned.

Examples of materials for forming a conductive mesh pattern of the touch electrode layer include, but are not limited to, metal mesh, silver nanowires, carbon nanotubes, nanonet, graphene, and conductive polymers such as poly (3, 4-ethylenedioxythiophene), and polystyrene sulfonic acid (PEDOT: PSS). In some embodiments, the conductive mesh structure is made of a metal mesh such as a nano silver mesh.

In an embodiment of the present disclosure, the first touch electrode layer and the first connection part may be simultaneously formed in a same patterning process. For example, the conductive material layer may be formed on the base substrate and then the conductive material layer is subjected to a patterning process so as to simultaneously form a pattern of the first touch electrode layer and a pattern of the first connection part.

In an embodiment of the present disclosure, the first dummy electrode includes a first floating dummy electrode, a main dummy electrode and a second floating dummy electrode.

The main dummy electrode includes the at least one conductive path that is continuous between the first end and the second end and is configured to release electrostatic charges accumulated in the first dummy electrode.

The first floating dummy electrode divides the main dummy electrode into a plurality of dummy sub-electrodes and is located between adjacent dummy sub-electrodes. The first floating dummy electrode is separated from and thus electrically insulated from the dummy sub-electrodes located on two sides of the first floating dummy electrode by disconnection parts. In an embodiment of the present disclosure, the first floating dummy electrode is formed as a plurality of X-shaped structures isolated from each other or a plurality of linear structures isolated from each other.

The second floating dummy electrode is located between the main dummy electrode and a first touch electrode on one side of the first dummy electrode. The second floating dummy electrode is separated from and thus electrically insulated from the main dummy electrode by first disconnection parts. The second floating dummy electrode is separated from and thus electrically insulated from the first touch electrode by second disconnection parts. In an embodiment of the present disclosure, the second floating dummy electrode is formed as a plurality of linear structures isolated from each other or a plurality of X-shaped structures isolated from each other.

In step S2, an insulating layer is formed on one side of the first touch electrode layer.

In an embodiment of the present disclosure, the insulating layer is made of a transparent material, so that the touch substrate can be applied to a display panel integrated with touch control. In some embodiments, the insulating layer may be made of any one of silicon oxynitride (SiNxOy) and silicon oxide ($SiO_2$), or a combination of them.

In step S3, a second touch electrode layer located in the touch electrode area and a second connection part located in the peripheral area are formed on one side of the insulating layer away from the first touch electrode layer. The second touch electrode layer includes second touch electrodes and second dummy electrodes which are alternately arranged along the second direction and are separated from each other, the second touch electrodes and the second dummy electrodes extend along the first direction, the second touch electrodes and the second dummy electrodes both are conductive mesh structures, the second dummy electrode has a third end and a fourth end along the first direction and includes at least one conductive path that is continuous between the third end and the fourth end, and the second connection part is connected to at least one of the third end and the fourth end such that the at least one conductive path that is continuous between the third end and the fourth end is connected to the ground line in the peripheral area through the second connection part.

In an embodiment of the present disclosure, the second dummy electrode may be formed to have a structure similar to that of the first dummy electrode.

In an embodiment of the present disclosure, the second touch electrode layer and the second connection part may be simultaneously formed in a same patterning process. For example, a conductive material layer may be formed on the base substrate, and then the conductive material layer is subjected to a patterning process so as to form a pattern of the second touch electrode layer and a pattern of the second connection part.

It should be noted that, in some embodiments, the first touch electrode layer and the second touch electrode layer both are formed on a same side of the base substrate, and the first touch electrode layer may be disposed on one side of the second touch electrode layer away from the base substrate (as shown in FIG. 8), or the second touch electrode layer may be disposed on one side of the first touch electrode layer away from the base substrate (not shown in the figure); and the above base substrate may be a base substrate of a color filter substrate, such as an on-cell touch display device, or may be a cover plate of a touch display device, such as an out-cell touch display device.

In the method for manufacturing the touch device according to the present disclosure, the dummy electrode is formed to include at least one conductive path that is continuous between two ends thereof, and the at least one conductive path is connected to a connection part, which is located in the peripheral area of the touch substrate and is connected to a ground line, through at least one end of the dummy electrode, so that electrostatic charges accumulated in the dummy electrode can be released, thereby effectively reducing the accumulation of the electrostatic charges in the dummy electrode.

It should be understood that the above embodiments are merely exemplary embodiments that are employed to illustrate the principles of the present disclosure, and that the present disclosure is not limited thereto. Various changes and modifications may be made by those skilled in the art without departing from the spirit and essence of the present disclosure, and should be considered to fall within the protection scope of the present disclosure.

What is claimed is:

1. A touch substrate, having a touch electrode area and a peripheral area surrounding the touch electrode area, and comprising:
    a first touch electrode layer in the touch electrode area, the first touch electrode layer comprising first touch electrodes and first dummy electrodes alternately arranged along a first direction and separated from each other, wherein the first touch electrodes and the first dummy electrodes extend along a second direction intersecting the first direction, the first touch electrodes and the first dummy electrodes both are conductive mesh structures, and the first dummy electrode has a first end and a second end along the second direction and comprises at least one conductive path that is continuous between the first end and the second end; and
    an electrostatic release structure in the peripheral area, the at least one conductive path being electrically connected to the electrostatic release structure through one of the first end and the second end of the first dummy electrode,
    wherein the touch substrate further comprises a second touch electrode layer insulated from and stacked with the first touch electrode layer in the touch electrode area, and a second connection part in the peripheral area; and
    the second touch electrode layer comprises second touch electrodes and second dummy electrodes alternately arranged along the second direction and separated from each other, the second touch electrodes and the second dummy electrodes extend along the first direction, the second touch electrodes and the second dummy electrodes both are conductive mesh structures, and the second dummy electrode has a third end and a fourth end along the first direction and comprises at least one conductive path that is continuous between the third end and the fourth end and is electrically connected to the electrostatic release structure.

2. The touch substrate of claim 1, wherein the first dummy electrode comprises a floating dummy electrode and a main dummy electrode, the floating dummy electrode comprises a plurality of structures isolated from each other, the main dummy electrode comprises the at least one conductive path that is continuous between the first end and the second end, and the floating dummy electrode is separated from the main dummy electrode by disconnection parts.

3. The touch substrate of claim 2, wherein the main dummy electrode comprises a plurality of dummy sub-electrodes, the floating dummy electrode comprises a first floating dummy electrode between adjacent dummy sub-electrodes, the first floating dummy electrode is separated from the dummy sub-electrodes on two sides thereof by the disconnection parts, and each dummy sub-electrode comprises at least one conductive path that is continuous between the first end and the second end.

4. The touch substrate of claim 3, wherein the first floating dummy electrode comprises a plurality of first structures isolated from each other, and the first structures comprise at least one of linear structures and X-shaped structures.

5. The touch substrate of claim 4, wherein the first structures are X-shaped structures.

6. The touch substrate of claim 2, wherein the floating dummy electrode comprises a second floating dummy electrode between the main dummy electrode and a first touch electrode adjacent to the first dummy electrode, and the second floating dummy electrode is separated from the main dummy electrode by first disconnection parts and is separated from the first touch electrode adjacent to the first dummy electrode by second disconnection parts.

7. The touch substrate of claim 6, wherein the second floating dummy electrode comprises a plurality of second structures isolated from each other, and the second structures comprise at least one of linear structures and X-shaped structures.

8. The touch substrate of claim 7, wherein the second structures are linear structures.

9. The touch substrate of claim 1, wherein the first touch electrodes and the first dummy electrodes are made of a same material and have a same mesh pattern.

10. The touch substrate of claim 1, further comprising a first connection part in the peripheral area, wherein the first connection part is connected to at least one of the first end and the second end and is electrically connected to the electrostatic release structure.

11. The touch substrate of claim 10, wherein the first connection part and the first dummy electrode are made of a same material.

12. The touch substrate of claim 10, wherein a touch signal line is between the first connection part and the electrostatic release structure and in a same layer as the first dummy electrode; and
    the first connection part comprises a first conductive layer and a second conductive layer which are stacked, the first conductive layer is electrically connected to one of the first end and the second end, the second conductive layer is connected to the electrostatic release structure, and the first conductive layer is electrically connected to the second conductive layer through a conductive via.

13. The touch substrate of claim 10, wherein the first dummy electrode, the first connection part and the electrostatic release structure are in a same layer.

14. The touch substrate of claim 1, wherein the electrostatic release structure is a ground line.

15. A touch device, comprising the touch substrate of claim 1.

16. A method for manufacturing a touch substrate, comprising:
   forming a first touch electrode layer in a touch electrode area of the touch substrate, wherein the first touch electrode layer comprises first touch electrodes and first dummy electrodes alternately arranged along a first direction and separated from each other, the first touch electrodes and the first dummy electrodes extend along a second direction intersecting the first direction, the first touch electrodes and the first dummy electrodes both are conductive mesh structures, and the first dummy electrode has a first end and a second end along the second direction and comprises at least one conductive path that is continuous between the first end and the second end;
   forming an electrostatic release structure in a peripheral area of the touch substrate, the at least one conductive path being electrically connected to the electrostatic release structure through one of the first end and the second end of the first dummy electrode;
   forming an insulating layer on the first touch electrode layer; and
   forming, on a side of the insulating layer away from the first touch electrode layer, a second touch electrode layer in the touch electrode area and a second connection part in the peripheral area, wherein the second touch electrode layer comprises second touch electrodes and second dummy electrodes alternately arranged along the second direction and separated from each other, the second touch electrodes and the second dummy electrodes extend along the first direction, the second touch electrodes and the second dummy electrodes both are conductive mesh structures, and the second dummy electrode has a third end and a fourth end along the first direction and comprises at least one conductive path that is continuous between the third end and the fourth end and is electrically connected to the electrostatic release structure.

17. The method of claim 16, further comprising: forming a first connection part in the peripheral area, wherein the first connection part is connected to at least one of the first end and the second end and is electrically connected to the electrostatic release structure.

18. The method of claim 17, wherein the first touch electrode layer and the first connection part are simultaneously formed in a same patterning process.

* * * * *